United States Patent [19]

Zimmer

[11] Patent Number: 5,302,202
[45] Date of Patent: Apr. 12, 1994

[54] PROCESS AND DEVICE FOR APPLYING A COATING OR SUBSTANCE E.G. ADHESIVE FOR WASHING AND/OR DRYING AN ENDLESS CONVEYOR BELT OR THE LIKE

[76] Inventor: Johannes Zimmer, Ebentaler Str. 133, A-9020 Klagenfurt, Austria

[21] Appl. No.: 939,843

[22] Filed: Sep. 2, 1992

Related U.S. Application Data

[63] Continuation of Ser. No. 635,115, filed as PCT/AT90/00055, Jun. 6, 1990, abandoned.

[30] Foreign Application Priority Data

Jun. 13, 1989 [AT] Austria .................. 1446/89

[51] Int. Cl.⁵ ............................................. B05C 11/04
[52] U.S. Cl. ........................................ 118/70; 118/126
[58] Field of Search ................. 118/100, 120, 126, 70; 427/355, 356, 359

[56] References Cited

U.S. PATENT DOCUMENTS

| | | | |
|---|---|---|---|
| 2,655,865 | 10/1953 | Geiringer | 118/70 |
| 3,101,837 | 8/1963 | Martin | 118/70 |
| 3,128,207 | 4/1964 | Schmitt | 118/126 |
| 3,149,005 | 9/1964 | Brundige | 118/70 |
| 3,566,784 | 3/1971 | Mitter | 101/120 |
| 3,919,973 | 11/1975 | Zimmer | 118/406 |
| 4,241,691 | 12/1980 | Hopfe | 118/126 |
| 4,375,202 | 3/1983 | Miller | 118/117 |
| 4,665,723 | 5/1987 | Zimmer | 118/406 |
| 4,802,440 | 2/1989 | Kronseder | 118/261 |
| 4,993,352 | 2/1991 | Zimmer | 118/112 |

Primary Examiner—Shrive Beck
Assistant Examiner—Katherine A. Bareford
Attorney, Agent, or Firm—Herbert Dubno

[57] ABSTRACT

In a process or device for coating, washing and/or drying it is proposed to use for each of the coating, cleaning and/or drying procedures a functional unit consisting essentially of two working components, whereby these two working components are attracted or moved towards or pressed against a conveyor belt. One of these working components performs spreading, sliding, scraping or squeezing.

5 Claims, 2 Drawing Sheets

PROCESS AND DEVICE FOR APPLYING A COATING OR SUBSTANCE E.G. ADHESIVE FOR WASHING AND/OR DRYING AN ENDLESS CONVEYOR BELT OR THE LIKE

CROSS REFERENCE TO RELATED APPLICATIONS

This is a continuation of co-pending application Ser. No. 07/635,115 filed on Feb. 13, 1991, now abandoned, which application is a national phase of PCT/AT90/00055 filed Jun. 6, 1990 and based in turn, upon Austrian national application filed Jun. 13, 1989.

FIELD OF THE INVENTION

The invention relates to a process and a device for applying a coat of substance, e.g. adhesive, for washing and/or drying of for instance an endless conveyor belt or the like, for instance a printer's blanket in a printing machine.

OBJECTS OF THE INVENTION

It is therefore the principal object of the present invention to provide a method for treating a web to be coated wherein different operations related to treating a conveyor belt are utilized by identical structural devices.

Another object o the present invention is to provide a device capable of selectively spreading adhesion, squeezing adhesion and scraping the belt.

SUMMARY OF THE INVENTION

The present invention is directed particularly to a new treatment process, which is suited for all three operations—adhesive application, washing and drying of the conveyor belt—and consequently, to a combined auxiliary treatment process respectively working in several stages, wherein these three operations using the same process technique, are arranged in sequence, respectively take place in order, one after the other.

Besides, the invention encompasses also the improved design of the treatment device in accordance with the process.

The invention proposes that for each of the coating, cleaning and/or drying procedures a functional unit consisting basically of two working components be used, and that these two components be attracted or moved against the conveyor belt or pressed against it by magnetic force, whereby one of these working elements is designed to perform its function by spreading, sliding, scraping or squeezing.

It is a remarkable advantage of this invention, from the constructional, economical and technological points of view, that an essentially similar construction or design, can be used for various purposes, which however are technologically and functionally correlated, forming a processing assembly in their cooperation.

For instance, the endless conveyor belt of a textile printing machine is usually initially coated with a thin layer of adhesive at each cycle, after which the material to be printed is placed on it and printed on. After the printing the material is removed and directed to the drying station and after this operation the printer's blanket remains covered with adhesive remnants, textile fibres or slubs and partially also with the printing dyes. Therefore the material has to be washed and subsequently dried again, in order to be prepared for a new adhesive coating.

As a rule, this sequence of procedures takes place once per cycle and again, in its assembly, constitutes a component of the general printing process, or, it could also be said, that it constitutes an auxiliary process cycle of the printing process.

According to the present state of the art, for the adhesive application, the washing and the drying different technologies and correspondingly devices of different construction and design have been used.

For the application of adhesive, application rollers and doctor blades are known. As to the washing, up to now mostly brush arrangements i.e. line brushes, roller brushes and circular brushes or the like are used in combination with water and optionally solvents. Brushes, squeezing rollers or mechanically operated squeegees, sometimes combined with subsequent treatment with warm air or the like are used for drying.

The present invention discloses at first a novel treatment process which is suitable for all three operations—adhesive application, washing and drying. As a consequence, these three operations using the same technique are arranged in sequence and respectively take place in order one after the other.

Besides, the invention also discloses comprises the improved structure of this treatment device according to the process.

The process of the invention of the application of adhesive or the like, the washing and/or drying of a preferably endless conveyor belt, e.g. a so-called printer's blanket in a printing machine or the like, is characterized in that for the application, or cleaning or drying procedures a functional unit consisting essentially of two working components is used, whereby a permanent magnet or an electromagnet is incorporated in one of the components, while the other component is magnetizable at least in certain areas, so that both can work together by magnetic force in order to create the pressure force required by the working component directly performing the operation at the time. The working element can be of various construction, performing its function by spreading, or sliding or scraping or squeezing, but under no circumstances by rolling, whereby, in order to increase efficiency and to reduce wear, it is also possible to provide an auxiliary unit which moves the working component back and forth, transversely to the travel direction of the conveyor belt.

According to the device of the invention, the working element can be described as a magnetically operated doctor element, whereby this doctor element varies in its construction from the heretofore-known magnetically operated doctor elements, to its novel features, as disclosed by the invention.

In the process according to the invention, a time sequence is given, since during one revolution of the endless conveyor belt, which can take approximately 20 to 60 seconds, firstly, the adhesive film is applied, then it is washed and scraped and finally it's scraped dry. Another possibility consists in applying the adhesive film, gluing to it the goods which are printed during several revolutions and then again removed. After that, the washing device is activated for several revolutions and another revolution is performed by using the drying device.

BRIEF DESCRIPTION OF THE DRAWING

The above and other objects, features nd advantages of my invention will become more readily apparent from the following description, reference being made to the accompanying highly diagrammatic drawing in which.

SPECIFIC DESCRIPTION

Figure 1:
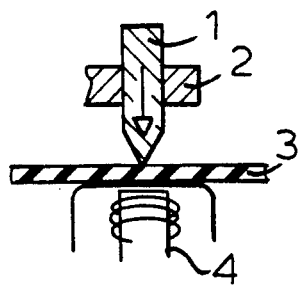
FIG. 1 is a cross sectional view of the squeeze according to the prior art.

In FIG. 1, a known spreading doctor blade device is represented, wherein the doctor blade 1 is arranged in a support 2 and rests against a conveyor belt 3. The doctor blade 1 is pressed against the conveyor belt 3 by a magnet 4. The disadvantage of the device shown in this figure resides for instance in the fact that the doctor blade is rigid, respectively designed with inherent rigidity, it is cumbersome to handle and as a result of its inherent rigidity has always the tendency to bend (buckle), particularly with working width of more than 1000 mm. Since the working table or the roller containing the magnet 4 usually has small irregularities in the case of large working widths, and because the conveyor belt in the case of large working widths and lengths can hardly be produced without small thickness irregularities, the required evenness of pressure against the conveyor belt can not really be achieved in practice. Therefore, such devices have not been introduced in practice.

Figure 2:
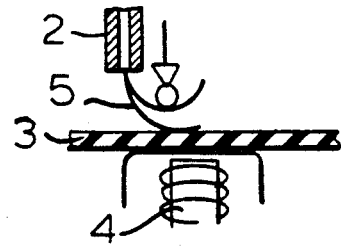
FIG. 2 is a cross sectional view of another embodiment of the prior art.

In FIG. 2, another known device is shown. Here, an elastic blade 5 held in a support 2 is pressed against the conveyor belt 3 and the pressure of the elastic blade is produced here by means of an additional magnetizable pressure ledge. This device according to FIG. 2 is hardly suitable for a precise and even treatment over the entire working width, as a result of the longitudinal and transversal elasticity of blade 5. They rather create the danger of dirtying the surface of the conveyor belt 3, and when set at a steep angle, can scratch or cut the belt.

Figure 3:
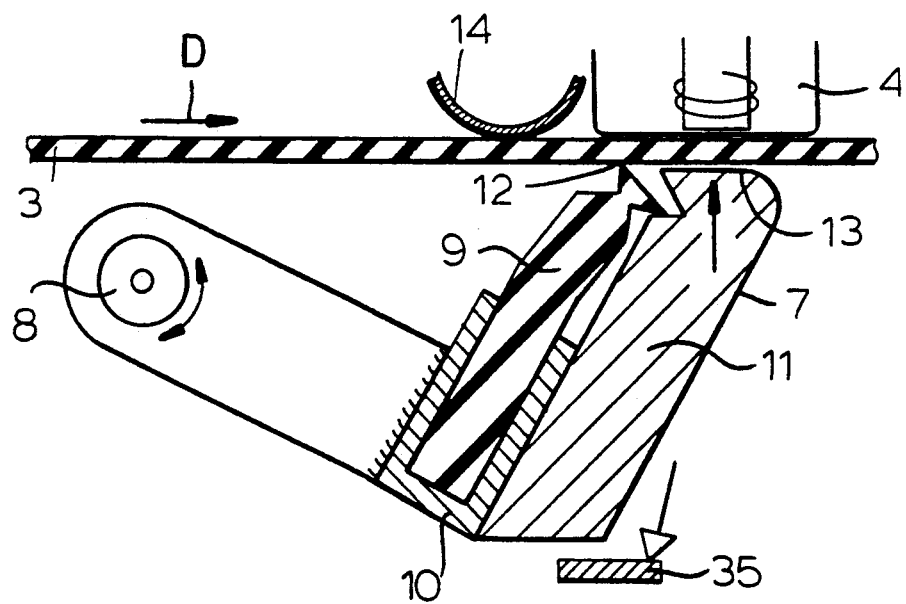
FIG. 3 is a cross sectional view of an embodiment of the squeeze device according to the invention.
Figure 4:
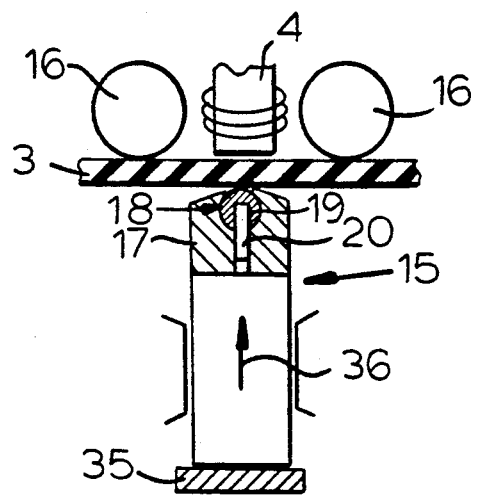
FIG. 4 is a cross sectional view of another embodiment of device according to the present invention.

In FIGS. 3 and 4, devices according to the invention are shown, each being arranged at the bottom side of the conveyor belt 3 directed along an arrow D. In both embodiments, an even pressure of the working element against the surface of the conveyor belt 3 is insured. It is self-understood that this even pressure and the suitability for three totally different operations can be achieved in different ways.

According to FIG. 3, a magnetizable ledge 7 is, for instance, fastened to a swivel joint 8 and the magnetizable ledge 7 consists of a working element 9, e.g. a bending and pressure resilient, profiled and, lamellar plate, preferably made of a polymeric plastic material and of a pressure element 11, carrying a mounting support 10 for the insertion of the working element 9. Due to the mounting support 10, the working element 9 is kept parallel to the pressure element 11 made of a magnetizable material, and the working edge 12 projects slightly over the surface 13 of the pressure element 11, which faces the magnet 4 and the conveyor belt 3.

In FIG. 3, the device according to the invention is shown in operation, whereby the pressure element 11 and consequently also the working element 9 are attracted in a generally vertical direction with respect to the plane of the conveyor belt, however the surface 13 of the pressure element 11 does not touch the conveyor belt, which would hinder its operation. As a result of the described magnetically produced attraction, the working edge 12 of the working element 9 lies against the surface of the conveyor belt, whereby a beam-shaped counterelement 14 containing the magnet 4 or connected therewith, provides the required counterpressure for the respective operation.

The possible function-impairing irregularities existing in the counterpressure element 14, respectively its glide surface, also in the conveyor belt are compensated for by combination according to the invention between the bending or pressure resiliency with the magnetically produced pressure force, so that a faultless application of adhesive, or a faultless cleaning or drying can be performed.

In FIG. 4, a two-part device 15 according to the invention is provided below the conveyor belt 3, this device carrying a working element 15 in the shape of a round profiled rod 19 in a recess 18 on its upper part 17. The profiled rod 19 is secured against twisting by pinned fitting. It does not necessarily require a circular cross section, but can have any other bevelled or rounded shape. The profiled rod 19, respectively the ledge 17 carrying it, is attracted by magnet 4 and the tubular bodies 16 serve here as countersurfaces. In FIG. 4, the pressure resilient component required by the process is provided by the pressure and bending elasticity of the conveyor belt 3 and by the pressure force direction with respect to the working edge of the blade indicated by arrow 36. The upper ledge 17, preferably made of a magnetizable material, of the device 15 according to the invention is massive. The lower part of the device 15, which is not hatched in the drawing, is serrated several times over its length. Due to this, it is possible to enhance the bending elasticity in advantageous manner. As can be seen from FIG. 3, the device according to the invention is here in working position., i.e. it is lifted from its rest surface 35 and brought into working position due to magnetic pressure. In FIG. 4, the device according to the invention is in its rest position, i.e. it is not in operation. The magnet 4 is disconnected and in this state the device rests on the resting surface 35 and has no contact with the conveyor belt 3. When the magnet 4 is connected, the device 15 is then moved in the direction of arrow 36, until the contact with the conveyor belt 3 is established.

What both embodiments of FIG. 3 and FIG. 4 have in common is the utmost care exercised in the selection of the materials and dimensions of the individual components finely attuned to each other by considering all existing, or acting, mutually functional interactions, such as between the strength (magnet force) and the arrangement of the magnetic field, also the strength (magnetizable mass) of the ledge. The second working component producing the pressure force, as well as the pressure and bending resiliency component integrated in the process of the invention.

It is conceivable that in FIG. 3, instead of the two ledges, the one with the pressure function and the other with the working function, to use one ledge combining both these functions, like the one or similar to the one described and represented in FIG. 4. Further, it is conceivable that in the embodiment of FIG. 4, instead of the detachment between conveyor belt 3 and the end of the magnet core, respectively of the surface emanating the magnetic force, the surface, respectively the bordering surface could be designed as a support and slide surface for the conveyor belt 3. Of course, in this case the device 15 of the invention and the conveyor belt would have to be pressure and optionally also bending resilient.

In the described embodiments it has been made clear that these two devices according to FIGS. 3 and 4, which have different cross sections, represent different structural approaches in their basic concept but, actually stem from the same inventive thought.

It is conceivable that the embodiment shown in FIG. 3 and in FIG. 4, as well as other possible embodiments not represented in the drawing, are capable of acting independently of their spatial arrangement and therefore also capable of functioning in any other desired spatial arrangement. Three such possibilities of other arrangements in space are shown in broken lines in FIG. 5.

Figure 5:
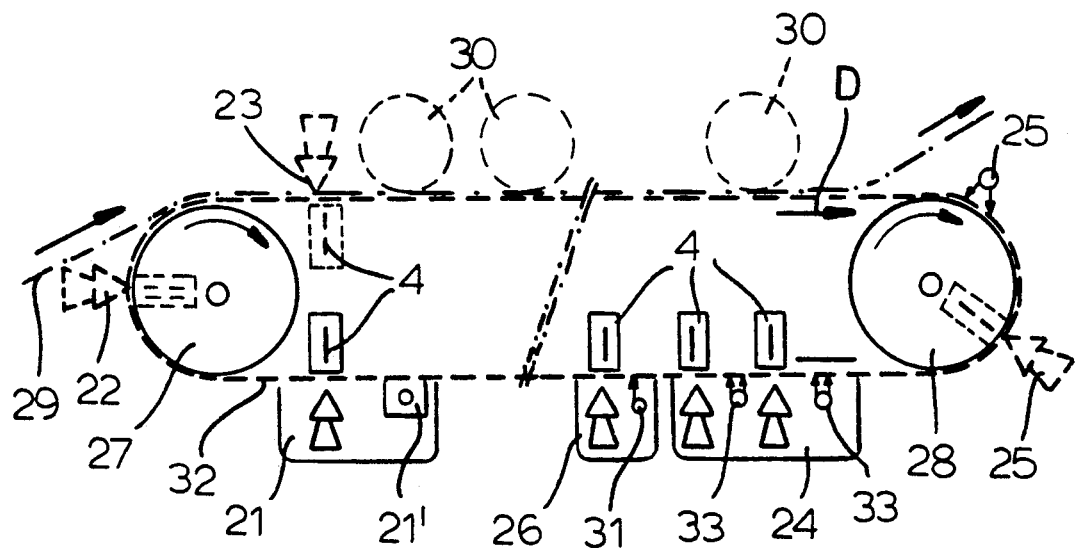
FIG. 5 is a diagrammatical of the printing device according to the present invention.

FIG. 5 shows schematically a longitudinal section trough a drum-type screen printing machine, equipped with an endless conveyor belt 32, which is guided over a drive roller 27 and a deflection roller 28, and into which one of the three possible functional units according to the invention is built in—the first one for the application of a flowable, preferably viscous medium, e.g. an adhesive, the second carrying out the cleaning and the third for the drying of the conveyor belt 32. In this figure, schematically shown devices 21, 22 and 23 for the application, respectively spreading of e.g. adhesive applied by 21', devices 24 and 25 for the cleaning or scraping of materials soaked in cleaning fluids, e.g. adhesive residues, dye-paste residues, textile fibers or slubs, dust, and the device 26 for drying, i.e. designed as a drying squeegee. Also in FIG. 5 it is schematically indicated that a web of material 29 is placed on the conveyor belt 32 approximately at the drive roller 27, is then passed together with the conveyor belt in front of the pressure stations 30 and finally again removed, approximately in the area of the deflection roller 28.

Upstream of the drying squeegees 26 clean or fresh rinsing fluid is injected or sprayed in (at 31), while for the cleaning in its entirety or in its largest part cleaning fluid is used (at 33), which is circulated by means of recycling pumps. The cleaning devices 24, 25 can be used either alternately, or combined in order to enhance the cleaning effect.

The device 21, 22, 23 according to the invention for application for instance of adhesive, auxiliary, respectively additionally completing the main concept of the invention regarding the process and the device, can be a magnetically operated drum applicator with a dipping tank known per se, which is not only a valuable technical development of the previously described invention object, but also economically advantageous mainly because it is possible to use for the production of the magnetic force. The same component is used for the other three working functions.

From the point of view of the process and the device, what is novel in this device is the application of a substance excess, since the heretofore-known application devices of this kind are suited only for the operation of dosed application, and not for application with subsequent scraping with dosed effect, as performed according to the invention.

In the variant 23 of the application operation wherein the device of the invention is located at the upper part of the conveyor belt, the substance to be applied, e.g. adhesive, can be predetermined manually or by mechanical auxiliary means of the device of the invention. Of course, in this case the web of material is directed towards the conveyor belt and pressed against it only in the area following the application of adhesive, a fact which is not shown in FIG. 5.

Also not shown is the possibility to extend the process techniques in their applicative function of coating with a preferably viscous, flowable substance, e.g. an adhesive, limited only to the previously shown use of coating an endless conveyor belt, also to apply them to other coating operations, particularly for the application of layers on web-like materials of all kind, of various thickness and different surface structure.

Instead of using crossbeam carriers with inserted devices producing magnetic force, it is also conceivable to use rollers emitting magnetic force, or, vice versa, magnetizable counterpressure rollers, whereby in this case the components producing the magnetic force would be arranged on the side of the web of material, respectively of the conveyor belt, whereupon the application or coating or scraping is performed.

Reverting again to the devices 21 shown in FIG. 5 with the double function of application and dosed scraping, it has to be mentioned as a further inventive thought that it is conceivable to arrange both working components in a single magnetic field. This makes sense particularly when a roller reflecting magnetic force is used and both operations are to be performed closely together in the area of the nadir of the roller.

Qualitative improvements of the process or the device of the invention can be achieved when the device is additionally equipped with an auxiliary device, which produces a periodical back and forth motion in a direction transversal to the travel direction of the conveyor belt or the web.

I claim:
1. A wiper system for a belt, comprising:
magnet means juxtaposed with one side of said belt;
a support swingably mounted on an opposite side of said belt and pivotal toward and away from said belt;
a magnetically attractable element on said support juxtaposed with said magnet means across said belt, said magnetically attractable element being formed with a shoulder turned toward said belt, said support being formed with a recess opening toward said belt and generally parallel to said magnetically attractable element;
a resilient working element received in said recess and generally spaced from said magnetically attractable element but deflectable toward said magnetically attractable element, said working element being formed with a head joined by a narrow neck with a body of said working element, said head having two edges, one of said edges forming a wiping edge engageable with said belt upon attraction of said magnetically attractable element toward said magnet means by magnetic force, the other of said edges bearing upon said shoulder upon attraction of said magnetically attractable element toward said belt.

2. A device for treating a web, said device comprising:

an endless conveyor belt formed with outer and inner sides and having upper and lower stretches displaceable along a closed path;

treating means for treating a web guided along said upper stretch of the belt along said path;

spreading means for spreading an adhesive on said outer side of the belt upstream from said treating means;

scraping means or cleaning the belt from said adhesive downstream of said treating means;

squeezing means located along said path between said treating and scraping means for squeezing said belt, each of said spreading, scraping and squeezing means constituting a wiper system, said wiper system comprising:

magnet means juxtaposed with one side of said belt;

a support swingably mounted on an opposite side of said belt and pivotal toward and away from said belt;

a magnetically attractable element on said support juxtaposed with said magnet means across said belt, said magnetically attractable element being formed with a shoulder turned toward said belt, said support being formed with a recess opening toward said belt and generally parallel to said magnetically attractable element;

a resilient working element received in said recess and generally spaced from said magnetically attractable element but deflectable toward said magnetically attractable element, said working element being formed with a head joined by a narrow neck with a body of said working element, said head having two edges, one of said edges forming a wiping edge engageable with said belt upon attraction of said magnetically attractable element toward said magnet means by magnetic force, the other of said edges bearing upon said shoulder upon attraction of said magnetically attractable element toward said belt.

3. The device defined in claim 2, further comprising application means for applying the adhesive to said inner side of the belt and located downstream of the working element, said application means including a further said wiper system.

4. The device defined in claim 2 wherein at least one of said magnetically attractable element is formed with a top surface facing the inner side of the belt and spaced therefrom in said second position, the working element being provided with an upper edge extending upwardly toward said inner side of the belt and urged there against in said second position of the magnetically attractable element.

5. The device defined in claim 4 wherein the working element of at least one of said wiper systems is replaceable in said recess.

* * * * *